US007471495B2

(12) United States Patent
Steffens et al.

(10) Patent No.: US 7,471,495 B2
(45) Date of Patent: Dec. 30, 2008

(54) VACUUM CIRCUIT BREAKER HAVING A HIGH CURRENT-CARRYING CAPACITY

(75) Inventors: Alexander Steffens, Langenfeld (DE); Martin Lakner, Gebenstorf (CH); Jochen Kiefer, Nussbaumen (CH); Daniel Chartouni, Baden (CH); Dietmar Gentsch, Ratingen (DE)

(73) Assignee: ABB Research Ltd, Zurich (CH)

( * ) Notice: Subject to any disclaimer, the term of this patent is extended or adjusted under 35 U.S.C. 154(b) by 7 days.

(21) Appl. No.: 11/812,316

(22) Filed: Jun. 18, 2007

(65) Prior Publication Data

US 2008/0000879 A1 Jan. 3, 2008

Related U.S. Application Data

(63) Continuation of application No. PCT/CH2005/000748, filed on Dec. 14, 2005.

(30) Foreign Application Priority Data

Dec. 20, 2004 (EP) .................................. 04405786

(51) Int. Cl.
*H02H 7/00* (2006.01)

(52) U.S. Cl. ...................................................... 361/115

(58) Field of Classification Search .................. 361/115
See application file for complete search history.

(56) References Cited

U.S. PATENT DOCUMENTS

| | | | | |
|---|---|---|---|---|
| 3,817,451 | A * | 6/1974 | Ramsey | 236/49.3 |
| 4,005,297 | A | 1/1977 | Cleaveland | |
| 6,564,568 | B1 * | 5/2003 | Shen | 62/230 |

FOREIGN PATENT DOCUMENTS

| | | |
|---|---|---|
| DE | 2 238 987 | 2/1974 |
| DE | 39 41 388 A1 | 6/1991 |
| EP | 1 022 758 A2 | 7/2000 |

OTHER PUBLICATIONS

PCT/ISA/210 for PCT/CH2005/000748 dated Feb. 24, 2006.
PCT.IPEA/409 for PCT/CH2005/000748 dated Mar. 20, 2007.

* cited by examiner

*Primary Examiner*—Stephen W Jackson
(74) *Attorney, Agent, or Firm*—Buchanan Ingersoll & Rooney PC

(57) ABSTRACT

The vacuum switching chamber has two contact pieces and is provided with at least one heat pipe for dissipating heat. The heat pipe contains a working medium for dissipating the heat by evaporating the working medium in a section, referred to as the evaporator, of the heat pipe and condensing the working medium in a section, referred to as the condenser, of the heat pipe. Advantageously, the evaporator is in close thermal contact with at least one contact piece, and, in particular, at least part of the evaporator is integrated in the first contact piece or the second contact piece. Advantageously, the condenser has a cooling rib arrangement.

21 Claims, 3 Drawing Sheets

VACUUM CIRCUIT BREAKER HAVING A HIGH CURRENT-CARRYING CAPACITY

RELATED APPLICATIONS

This application claims priority under 35 U.S.C. §119 to EP Application 04405786.7 filed in Europe on Dec. 20, 2004, and as a continuation application under 35 U.S.C. §120 to PCT/CH2005/000748 filed as an International Application on Dec. 14, 2005, designating the U.S., the entire contents of which are hereby incorporated by reference in their entireties.

TECHNICAL FIELD

The invention relates to the field of circuit breaker technology, in particular high-voltage and medium-voltage circuit breaker technology and particularly to vacuum switching chambers. It relates to a vacuum switching chamber and to a method for cooling a vacuum switching chamber in accordance with the preamble of the independent patent claims.

BACKGROUND INFORMATION

Vacuum switching chambers are known from the prior art which are forcibly cooled so as to increase the current-carrying capacity. The vacuum switching chamber is arranged in an insulating tube, through which air flows with the aid of a blower, with the result that, even in the event of a high current load, excessive heating of the vacuum switching chamber is avoided.

One problem with such an arrangement is the fact that the blower is active, i.e. needs to be driven. It requires maintenance and may fail.

The blower may possibly have a redundant design, as a result of which a higher degree of reliability can be achieved. Nevertheless, a higher degree of reliability of the cooling is desirable.

Furthermore, DE 39 41 388 A1 has disclosed a vacuum switching chamber which uses a heat pipe having cooling means for dissipating heat from the contact pieces, which heat pipe is coupled to the stationary upper contact piece and functions on the basis of the principle of the force of gravity. In this case, the lower contact piece, which is formed without a heat pipe, is connected movably to the housing via a folding bellows.

U.S. Pat. No. 4,005,297 has disclosed a vacuum switching chamber, in which the heat which arises is output via a heat pipe to cooling fingers, which are arranged radially around the heat pipe. Furthermore, it is also possible to use the heat pipe both in the moving contact piece and in the non-moving contact piece irrespective of the orientation with respect to the force of gravity, owing to the use of a condensation-assisting wick.

EP 1 002 758 A2 has described a vacuum switching chamber, in which an axial hole for accommodating a heat pipe is provided in the upper lifting ladder, which can be moved by a folding bellows. The total mass of the heat pipe is moved along when the contact piece is moved.

SUMMARY

The object of the invention is therefore to provide a vacuum switching chamber and a method for cooling a vacuum switching chamber of the type mentioned at the outset which do not have the abovementioned disadvantages. In particular, the intention is to provide a vacuum switching chamber having small masses to be moved and an effective cooling system.

This object is achieved by an apparatus and a method having the features of the independent patent claims.

The vacuum switching chamber according to the invention has at least one heat pipe. The heat pipe primarily serves the purpose of dissipating heat which is generated by an electrical current (rated current) flowing through the vacuum switching chamber in the closed switching state. In general, the vacuum switching chamber has at least two contact pieces, and the current flows through the two contact pieces.

Additional heat is generated during a short time span by an arc burning between the contact pieces during switching. This additional heat can also be partially dissipated by the heat pipe.

Owing to the provision of the heat pipe, efficient dissipation of heat is possible, with the result that a higher current-carrying capacity is achieved.

A heat pipe is a passive cooling apparatus. It does not require a current supply or any other supply. As a cooling system with a hermetically sealed circuit, it generally does not require any maintenance and can generally function without any maintenance over years and decades.

The physical size of the vacuum switching chamber can be kept very small given a high rated current-carrying capacity, owing to the provision of the heat pipe. A compact design with a high current-carrying capacity is now possible. Two or more heat pipes can be provided on one vacuum switching chamber.

Advantageously, a heat pipe is in close thermal contact with at least one of the contact pieces. Two or more heat pipes may also be provided in close thermal contact with one contact piece. Two or, if provided, even more contact pieces may also be in close thermal contact with in each case one or more heat pipes. It is also possible for a heat pipe to be in close thermal contact with two or more contact pieces.

The vacuum switching chamber may have RMF and/or AMF contact pieces.

In general, the at least one heat pipe contains a working medium for dissipating the heat by evaporating the working medium in a section, which is referred to as the evaporator, of the heat pipe and condensing the working medium in a section, which is referred to as the condenser, of the heat pipe. The working medium should be enclosed in a hermetically sealed volume, which comprises the evaporator and the condenser.

The heat pipe may be in the form of a thermosyphon. In the case of a heat pipe in the form of a thermosyphon, the return transport of the condensed working medium takes place (predominantly) by means of gravitation. Thus the condenser is arranged higher (in the gravitational field) than the evaporator, and there needs to be a monotonic gradient between them along the heat pipe.

In another embodiment, the heat pipe contains a means for passing condensed working medium back to the evaporator by means of capillary forces. Such an embodiment is preferably used when the condenser is arranged beneath the evaporator; but it can also be used in conjunction with a thermosyphon. Possible means for passing condensed working medium back to the evaporator by means of capillary forces are, for example, porous materials. Materials with a net-like structure and/or a woven structure are likewise suitable. Preferably, such means are provided on the inner face of the heat pipe. Owing to the provision of a means for passing condensed working medium back to the evaporator by means of capillary forces, the heat pipe and the vacuum switching chamber can be operated irrespective of their position.

Advantageously, the evaporator is in close thermal contact with the first contact piece. This allows for particularly efficient cooling in the region of this contact piece. It is also possible to arrange the evaporator in less direct thermal contact with the contact piece. For example, if the contact piece is connected to a contact stem, the evaporator may also be provided in close thermal contact with the contact stem. As a result, although the thermal contact to the contact piece is generally not as good, production of the vacuum switching chamber with the heat pipe may be simplified. Or if the contact stem is in turn connected to a contact carrier, the evaporator can also be provided in the contact carrier or at least in close thermal contact with the contact carrier. Such a contact carrier is generally immovable with the result that the heat pipe also needs to be immovable. A movable heat pipe could be realized, for example, by virtue of the fact that a flexibly deformable section of the heat pipe is preferably provided between the evaporator and the condenser, for example by means of a bellows or a hose consisting of an elastically deformable material.

With considerable advantage, at least part of the evaporator is integrated in the first contact piece. This ensures very effective thermal contact between the evaporator and the contact piece. In addition or as an alternative, at least part of the evaporator can also be integrated in a contact stem, which is connected to the first contact piece.

Advantageously, at least part of the evaporator can be formed by a cavity in the first contact piece. For example, the cavity may be formed by a blind hole.

Advantageously, the heat pipe is in close thermal contact with a stationary contact piece. As explained above, a simplified construction of the heat pipe is thereby possible. In addition, the mass to be moved during a switching operation is lower.

With considerable advantage, the condenser has an apparatus for heat emission. The apparatus for heat emission may be or contain, for example, a heat exchanger, a radiator or a cooling rib arrangement. If cooling ribs are provided, they are advantageously arranged such that they are aligned substantially vertically if the vacuum switching chamber is aligned as provided. In general, a vacuum switching chamber is designed to be substantially rotationally symmetrical with an axis, and the vacuum switching chamber is generally provided for mounting with a vertically aligned axis. In this case, the cooling ribs of the cooling rib arrangement are advantageously aligned substantially parallel to the axis.

Advantageously, the heat pipe has a flange having a cutting ring, and the flange can be screwed in a gas-tight and pressure-tight manner to the contact stem. This makes it possible to equip a vacuum chamber with a heat pipe, even retrospectively, in a simple and cost-effective manner.

In general, a vacuum switching chamber has an evacuated volume containing the contact pieces. Advantageously, the condenser or at least part of the condenser and in particular an apparatus for heat emission are arranged outside this volume.

Advantageously, a heat pipe, which has a flexibly deformable section, makes it possible to decouple the heat pipe mechanically from other parts. It has proven to be very advantageous to provide the flexibly deformable section between the evaporator and the condenser, whereby the evaporator is mechanically decoupled from the condenser.

A movable heat pipe can also be realized by virtue of the fact that the flexibly deformable section can be altered in terms of its length telescopically.

In a vacuum chamber in which the heat pipe is located in close thermal contact with the second contact piece, and this second contact piece is a movable contact piece, only that part of the heat pipe which comprises the evaporator advantageously moves in the event of a switching operation. That part of the heat pipe which comprises the condenser and further parts fixed to the condenser remain stationary during the switching operation, i.e. are mechanically decoupled from the evaporator. Owing to the mechanical decoupling, masses to be moved during the switching operation can therefore be reduced, which results in a reduction in the switching inertia of the vacuum chamber.

With considerable advantage, at least part of the evaporator on the second contact piece is integrated in the second contact piece. This ensures very effective thermal contact between the evaporator and the contact piece. In addition or as an alternative, at least part of the evaporator may also be integrated in a contact stem, which is connected to the second contact piece. Furthermore, it may also be very advantageous to form at least part of the evaporator by a cavity in the second contact piece. For example, the cavity can be formed by a blind hole.

With considerable advantage, the condenser on the second contact piece has an apparatus for heat emission. The apparatus for heat emission may be or contain, for example, a heat exchanger, a radiator or a cooling rib arrangement. If cooling ribs are provided, they are advantageously arranged such that they are aligned substantially vertically when the vacuum switching chamber is aligned as provided. In general, a vacuum switching chamber is designed to be substantially rotationally symmetrical with an axis, and the vacuum switching chamber is generally provided for mounting with a vertically aligned axis. In this case, the cooling ribs of the cooling rib arrangement are advantageously aligned substantially parallel to the axis. In general, a vacuum switching chamber has an evacuated volume, which contains the contact pieces. Advantageously, the condenser or at least part of the condenser on the second contact piece and in particular an apparatus for heat emission are arranged outside this volume.

Advantageously, the evaporator and the condenser are at the same electrical potential. A heat pipe according to the invention may have a hollow insulating body (for example a ceramic or glass tube), however, in order to bridge a potential difference between the evaporator and the condenser, in particular if the condenser (and in particular a cooling rib arrangement of the condenser) is intended to be touched when a high electrical voltage is being applied to the vacuum switching chamber and is therefore intended to be at ground potential. If the heat pipe is intended to form such an electrical isolation gap, an electrically insulating working medium also needs to be provided.

Advantageously, in particular if only one heat pipe is provided, the evaporator is arranged close to the center of the vacuum switching chamber. As a result, particularly efficient cooling of the vacuum switching chamber is achieved.

A switching device according to the invention, for example a heavy-duty circuit breaker, a high-voltage power circuit breaker, a generator circuit breaker, a medium-voltage circuit breaker or the like, has at least one vacuum switching chamber according to the invention.

The method according to the invention for cooling a vacuum switching chamber is characterized by the fact that a working medium is evaporated at a location referred to as the evaporator owing to the absorption of heat and is condensed at a location referred to as the condenser so as to emit heat, and the condensed working medium is passed back to the evaporator again, and that when cooling during the switching operation, the distance between the evaporator and the condenser is changed by a flexibly deformable section of the heat pipe. The absorbed and dissipated heat is generated substantially by a current (rated current) flowing through the vacuum switching chamber in the closed switching state.

Further preferred embodiments and advantages can be found in the dependent patent claims and the figures.

BRIEF DESCRIPTION OF THE DRAWINGS

The subject matter of the invention will be explained in more detail below with reference to preferred exemplary embodiments, which are illustrated in the attached drawing and in which, schematically.

Figure 1:
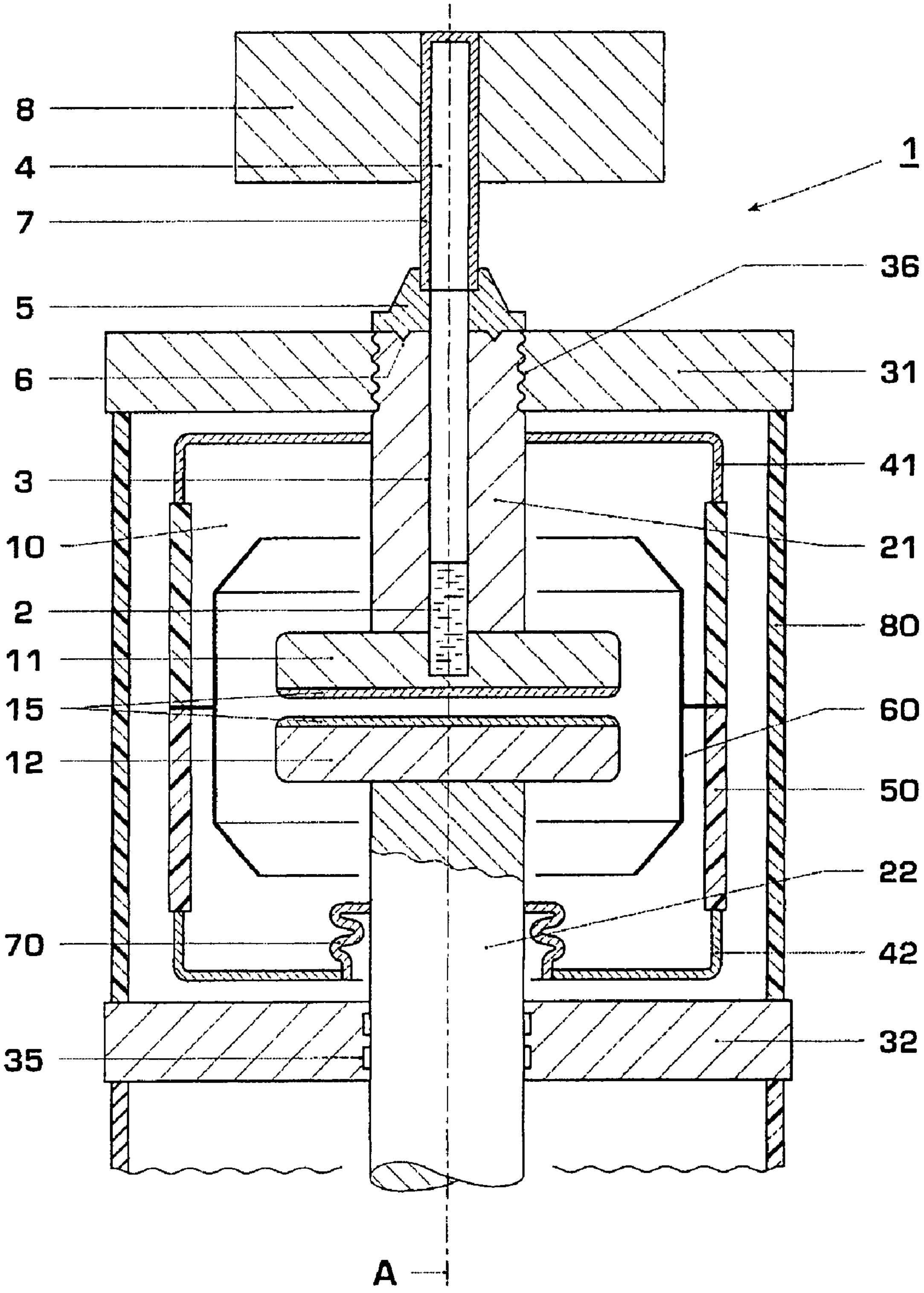
FIG. 1 shows a section through a vacuum switching chamber arranged in an outer insulating tube having a rigid heat pipe in accordance with the prior art.

The reference symbols used in the drawings and their significance are listed by way of summary in the list of reference symbols. In principle, identical or functionally identical parts are provided with the same or similar reference symbols. Some of the parts which are not essential for understanding the invention are not illustrated. The described exemplary embodiments represent, by way of example, the subject matter of the invention and have no restrictive effect.

DETAILED DESCRIPTION

FIG. 1 shows, schematically and sectioned, a vacuum switching chamber in the open state having a rigid heat pipe in accordance with the prior art.

The vacuum switching chamber is designed to be substantially rotationally symmetrical with an axis A and contains two contact pieces 11 and 12. The contact piece 12 can be moved by means of a drive (not illustrated). The contact piece 11 is stationary. The contact pieces 11 and 12 are fixed to contact stems 21 and 22, respectively.

The vacuum switching chamber further has an insulating body 50, typically consisting of ceramic, which is hollow-cylindrical and is sealed at its ends by in each case one cover 41; 42. The enclosed volume 10 is evacuated. The movable contact stem 22 is fixed to the cover 42 with a folding bellows 70 interposed. The stationary contact stem 21 is fixed to the cover 41. A shield 60 prevents the insulating body 50 from losing its insulating properties and becoming electrically conductive by being vaporized, primarily with metal vapor from an arcing zone between the contact pieces 11, 12.

The contact pieces 11, 12 and also the contact stems 21, 22 are advantageously from copper, and the contact pieces 11, 12 are provided on their mutually facing sides with a coating 15 consisting of an erosion-resistant material, for example Cu/Cr. A contact piece 11; 12 can also be formed integrally with a contact stem 21; 22.

In order to dissipate heat which is generated in the vacuum switching chamber, a heat pipe 1, which is integrated in the vacuum switching chamber, is provided. The heat is generated primarily owing to $I^2R$ losses which occur when the vacuum switching chamber (and the contact pieces) have an electrical current (rated current) flowing through them in the closed switching state.

In order to make electrical contact with the vacuum switching chamber, a bar-like fixed contact carrier 31 is connected to the contact stem 21, for example by means of a thread 36, and a likewise bar-like drive contact carrier 32 is connected in sliding fashion to the contact stem 22. In order to produce the electrical contact between the movable contact piece 22 and the drive contact carrier 32, spring contact rings or multiple-contact laminates (not illustrated) can be provided, for example, in cutouts 35.

Essential parts of the vacuum switching chamber are arranged within an outer insulating tube 80, which is used for electrical shielding and mechanical stabilizing purposes.

The heat pipe 1 has a volume which contains a working medium 2. Advantageously, the volume of the heat pipe 1 can be evacuated before the working medium 2 is introduced, with the result that it only contains the working medium.

The volume is formed by a plurality of subvolumes, which are provided in the contact piece 11, the contact stem 21, a flange 5 and a tube 7. A region of the heat pipe 1 which is arranged in the contact piece 11 and the contact stem 21 acts as the evaporator 3: owing to the absorption of heat of the contact piece 11, the initially liquid working medium 2 is evaporated. In a section, which is referred to as the condenser 4, of the heat pipe 1, the gaseous working medium 2 emits absorbed thermal energy again and condenses, whereupon it is passed back to the evaporator 3.

The tube 7, which is sealed at one end, preferably consists of copper and is welded, for example, to the flange 5, which advantageously has a connector for accommodating the tube 7. The flange 5 is screwed, for example, to the contact stem 21 and has a cutting ring 6, which interacts with the contact stem 21, for ensuring a gas-tight and pressure-tight connection.

Preferably, the contact stem 21 consists of soft-annealed copper, which is generally the case in any case owing to the production process of the vacuum switching chamber. The flange 5 consists of a harder material, preferably likewise of copper, for example copper having a quality which is hard as drawn.

The invention could also provide for the material of the contact stem 21 to be harder than that of the flange 5, in which case the cutting ring 6 would advantageously be provided on the contact stem 21.

The tube 7 or at least its upper part acts as the condenser 4. In order to enlarge the surface available for the condensation of the working medium 2, it is also possible to provide a pipe system of the heat pipe 1 in the condenser. In order to improve the heat absorption in the evaporator 3, a pipe system of the heat pipe 1 may also be provided there.

Figure 2:
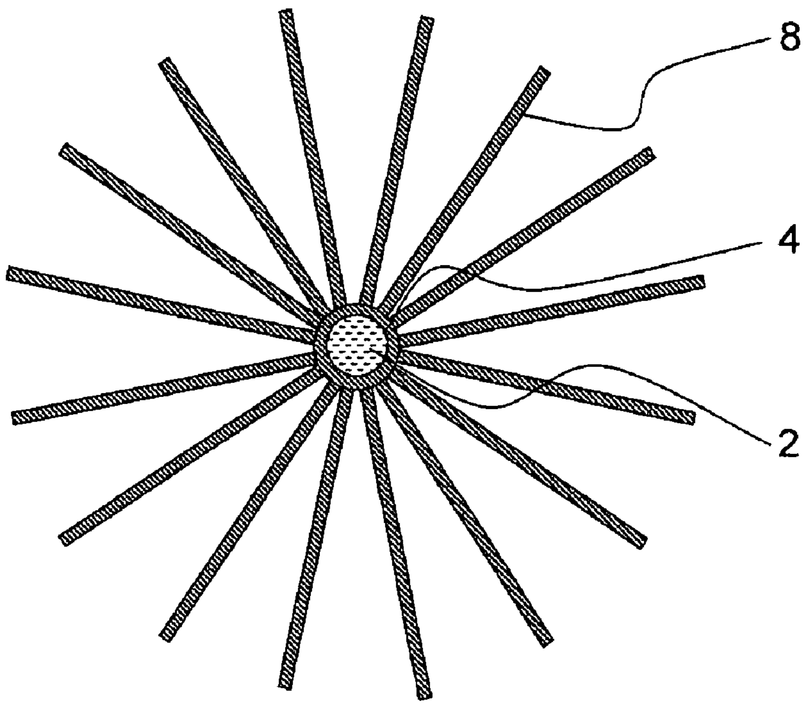
FIG. 2 shows a condenser with a cooling rib arrangement, sectioned at right angles to the axis.

In order to efficiently dissipate heat at the condenser 4, a cooling rib arrangement 8 is provided on the tube 7. Advantageously, the cooling ribs, which are aligned substantially parallel to the axis A, may be arranged approximately in the form of a star (radially) around the tube. FIG. 2 shows, schematically and sectioned parallel to the axis A, such a possible cooling rib arrangement. The individual cooling ribs can also be branched (not illustrated).

It is possible to provide forced cooling of the cooling rib arrangement 8 by means of blowers, for example.

Figure 3:
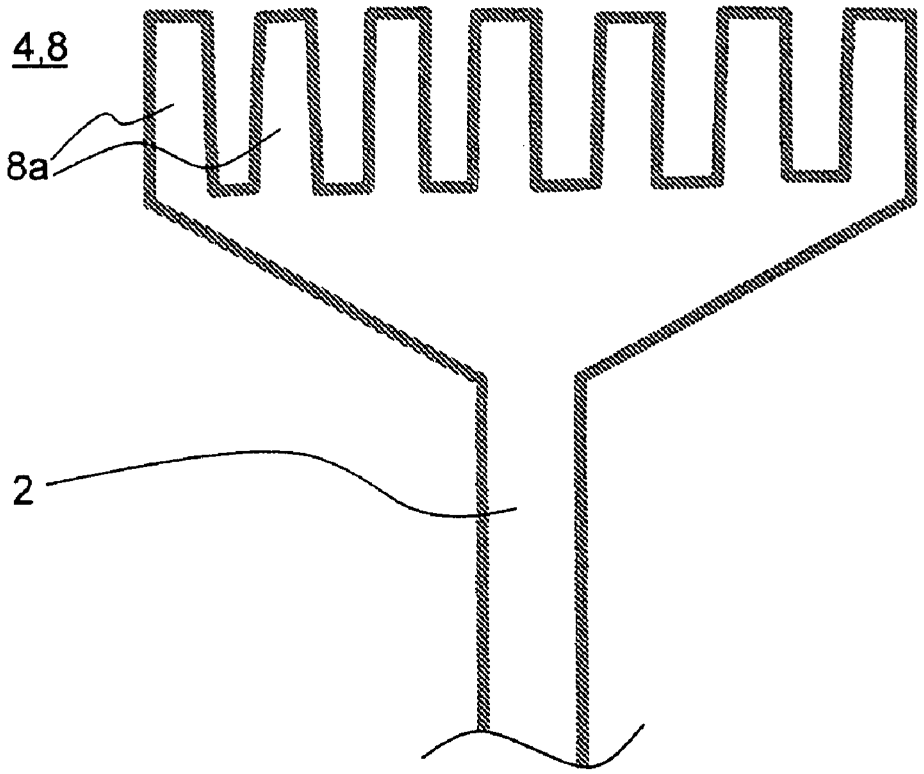
FIG. 3 shows a condenser with an integrated cooling rib arrangement, sectioned parallel to the axis.

FIG. 3 shows, schematically and sectioned parallel to the axis A, a further possible configuration of a condenser 4. Cooling ribs are integrated in the condenser 4. The condenser 4 has a large number of cavities 8*a*, which extend longitudinally and/or two-dimensionally. In this way, a large surface for cooling the condenser 4 from the outside by means of air (ambient air, possibly forced) is realized, on the one hand, and, on the other hand, a large surface is also realized on which working medium can condense from the inside.

Figure 4:
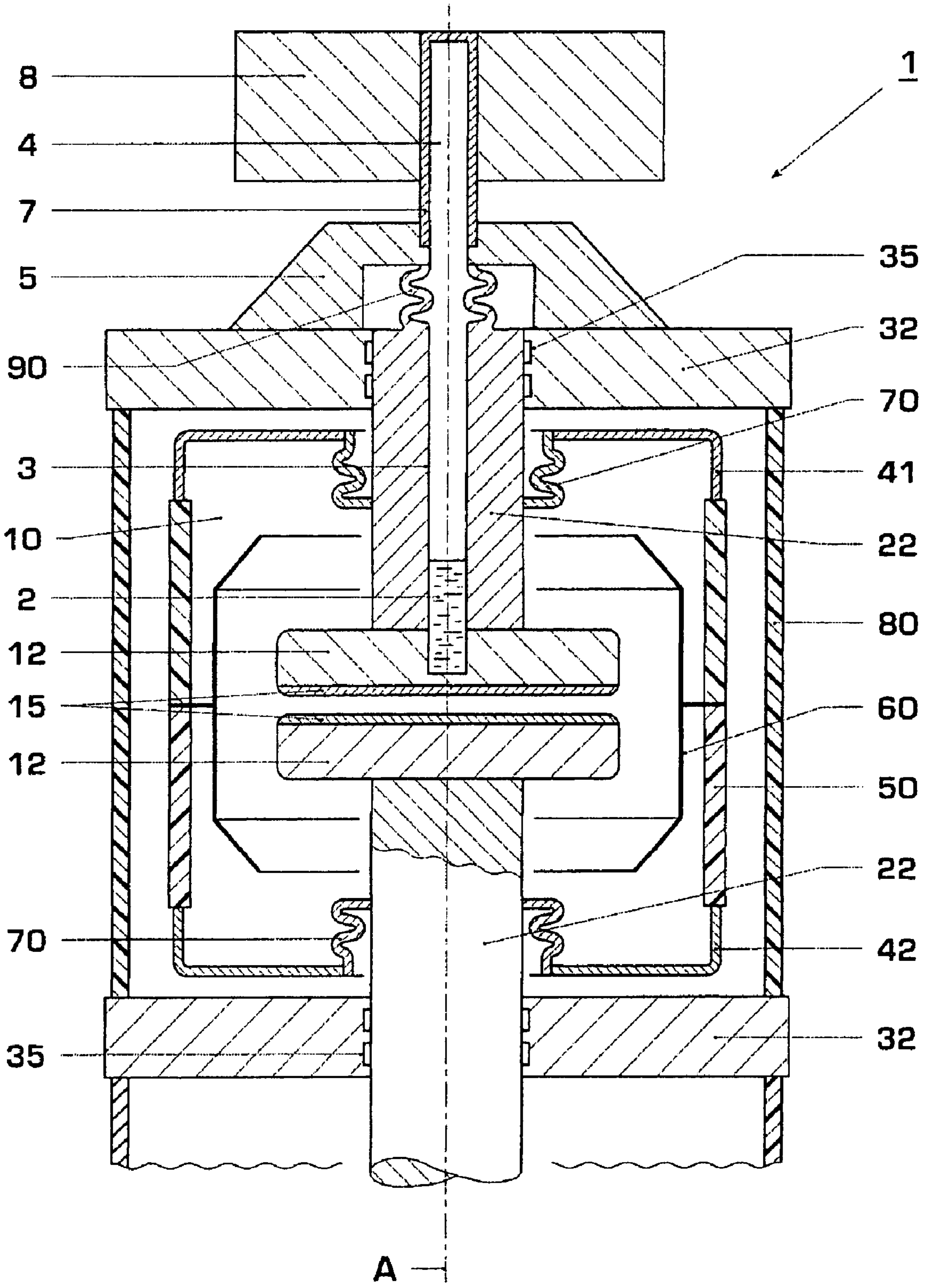
FIG. 4 shows an embodiment according to the invention of a vacuum switching chamber arranged in an outer insulating tube.

FIG. 4 shows, schematically and sectioned, an embodiment according to the invention of a vacuum switching chamber in the open state. In contrast to the vacuum chamber in FIG. 1, a vacuum chamber having two movable contact stems 22 is illustrated in FIG. 4. An integrated heat pipe 1 is provided in one of the two movable contact stems 22 for the purpose of dissipating heat which is generated in the vacuum switching chamber. In a further embodiment (not illustrated), as a deviation from FIG. 4, that movable contact stem 22 which is provided without the heat pipe 1 can be replaced by a stationary contact stem 21.

The volume of the heat pipe 1 is formed by a plurality of subvolumes, which are provided in the contact piece 12, the contact stem 22, the flexibly deformable section 90, the flange 5 and the tube 7. A region of the heat pipe 1 which is arranged in the contact piece 12 and the contact stem 22 acts as the evaporator 3. By absorbing heat from the contact piece 12, the initially liquid working medium 2 is evaporated and rises through the flexibly deformable section 90 in a section, referred to as the condenser 4, of the heat pipe 1, in which section the gaseous working medium 2 again outputs the absorbed thermal energy and condenses, whereupon it is passed back to the evaporator 3.

During a tripping operation, in which the rated current is interrupted, the contact piece 12 and the contact stem 22 are drawn back by a drive (not illustrated) and compress the flexibly deformable section 90 and press it against the flange 5. As a result, the length of the heat pipe is shortened. The tube 7, the condenser 4 and the cooling rib arrangement 8 are not moved during the tripping operation. Owing to the mechanical decoupling of the evaporator 3 and the condenser 4, the moving masses can be kept small.

A heat pipe 1 can advantageously be designed such that the internal pressure in the heat pipe 1 is approximately between 900 mbar and 1300 mbar if the contact pieces 11, 12 have current flowing through them. However, pressures of several bars are also possible, in particular if the heat pipe 1 is substantially metallic and therefore can withstand high pressures easily and remains gas-tight.

Suitable working media 2 are, for example, water, acetone, hydrochlorofluorocarbons, such as "FC-72" by 3M, for example, or hydrofluoroethers such as "HFE-7100" by 3M, for example.

The production of a vacuum switching chamber as shown in FIG. 1 can take place in two separate steps, in a first step the parts forming the volume 10 and the parts arranged in the volume 10 being assembled and it also advantageously being possible for the contact carriers 31, 32 and the outer insulating tube 80 to be attached, for example. In a second step, the working medium 2 can then be introduced, and the further parts belonging to the heat pipe 1 (flange 5, tube 7, cooling rib arrangement 8) are attached.

One advantage of the illustrated embodiment is the fact that the vacuum switching chamber can optionally be used with or without a heat pipe by the second production step simply being carried out or omitted.

Owing to the fact that a heat pipe or part of a heat pipe 1 is integrated in a current-carrying conductor of the vacuum switching chamber, a vacuum switching chamber can be realized which has a small physical size and a high current-carrying capacity.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Heat pipe
2 Working medium, working liquid
3 Evaporator
4 Condenser
5 Flange
6 Cutting ring, cutting edge
7 Tube, tube sealed at one end
8 Apparatus for heat emission, heat exchanger, cooling rib arrangement, radiator
**8*a*** Cavity extending longitudinally or two-dimensionally
10 Evacuated volume, vacuum
11 Contact piece, stationary contact piece
12 Contact piece, movable contact piece
15 Coating consisting of erosion-resistant material
21 Contact stem, stationary contact stem
22 Contact stem, movable contact stem
31 Contact carrier, fixed contact carrier, bar
32 Contact carrier, driving contact carrier, bar
35 Cutout, cutout for multiple-contact laminates, cutout for contact spring
36 Thread
41 Cover, upper chamber cover
42 Cover, lower chamber cover
50 Insulating body, insulating tube, ceramic
60 Shield
70 Bellows, folding bellows
80 Outer insulating tube
90 Flexibly deformable section
A Axis, axis of rotation

What is claimed is:

1. A vacuum switching chamber having a first contact piece and a second contact piece for switching an electrical current flowing through the vacuum switching chamber in the closed switching state and having at least one heat pipe, which contains a working medium, for dissipating heat generated by the electrical current in the vacuum switching chamber, the heat pipe comprising a section, which is referred to as an evaporator, and a section, which is referred to as a condenser, of the heat pipe, wherein the heat pipe has a flexibly deformable section.

2. The vacuum switching chamber as claimed in claim 1, wherein the flexibly deformable section is provided between the evaporator and the condenser.

3. The vacuum switching chamber as claimed in claim 1, wherein the flexible deformable section is a bellows or a hose consisting of an elastically deformable material.

4. The vacuum switching chamber as claimed in claim 1, wherein the flexible deformable section can be altered in terms of its length telescopically.

5. The vacuum switching chamber as claimed in claim 1, wherein the evaporator is in close thermal contact with the second contact piece.

6. The vacuum switching chamber as claimed in claim 5, wherein the second contact piece is a movable contact piece.

7. The vacuum switching chamber as claimed in claim 1, wherein the evaporator is in close thermal contact with the first contact piece.

8. The vacuum switching chamber as claimed in claim 7, wherein the first contact piece is a stationary contact piece.

9. The vacuum switching chamber as claimed in claim 7, wherein at least part of the evaporator is integrated in the first contact piece.

10. The vacuum switching chamber as claimed in claim 7, wherein at least part of the evaporator is formed by a cavity in the first contact piece.

11. The vacuum switching chamber as claimed in claim 7, wherein the condenser has an apparatus for heat emission.

12. The vacuum switching chamber as claimed in claim 11, wherein the apparatus for heat emission contains a cooling rib arrangement.

13. The vacuum switching chamber as claimed in claim 12, wherein it is designed to be substantially rotationally symmetrical with an axis (A), and in that cooling ribs of the cooling rib arrangement are aligned substantially parallel to the axis (A).

14. The vacuum switching chamber as claimed in claim 7 and where at least one contact stem is provided, wherein the heat pipe has a flange having a cutting ring, and the flange can be screwed in a gas-tight and pressure-tight manner to the contact stem.

15. The vacuum switching chamber as claimed in claim 7, wherein it has an evacuated volume containing the contact pieces, and in that at least part of the condenser is arranged outside this volume.

16. A switching device, containing at least one vacuum switching chamber as claimed in claim 1.

17. A method for cooling a vacuum switching chamber with the aid of a heat pipe, a working medium being evaporated at a location referred to as the evaporator owing to the absorption of heat generated in the vacuum switching chamber and being condensed at a location referred to as the condenser so as to emit heat, and the condensed working medium being passed back to the evaporator again, wherein, when cooling during a switching operation, the distance between the evaporator and the condenser is changed by a flexibly deformable section of the heat pipe.

18. The vacuum switching chamber as claimed in claim 13 and where at least one contact stem is provided, wherein the heat pipe has a flange having a cutting ring, and the flange can be screwed in a gas-tight and pressure-tight manner to the contact stem.

19. The vacuum switching chamber as claimed in claim 14, wherein it has an evacuated volume containing the contact pieces, and in that at least part of the condenser is arranged outside this volume.

20. A switching device, containing at least one vacuum switching chamber as claimed in claim 15.

21. A vacuum switching chamber comprising:

a vacuum switching chamber having at least one heat pipe, the at least one heat pipe comprising an evaporator and a condenser; and a first contact piece and a second contact piece for switching an electrical current flowing through the vacuum switching chamber in a closed switching state, wherein the at least one heat pipe contains a medium to dissipate heat generated by the electrical current in the vacuum switching chamber.

* * * * *